US012616923B2

(12) United States Patent
Mustakangas et al.

(10) Patent No.: US 12,616,923 B2
(45) Date of Patent: May 5, 2026

(54) SEALING STRIP FOR SEALING ADJACENT FILTER PLATE ASSEMBLIES OF A FILTER PRESS, SUCH AS A TOWER PRESS, A FILTER FRAME, A FILTER FRAME ASSEMBLY AND A FILTER APPARATUS

(71) Applicant: Metso Outotec Finland Oy, Tampere (FI)

(72) Inventors: Mirva Mustakangas, Pirkkala (FI); Ismo Juvonen, Rauha (FI); Janne Kaipainen, Halsua (FI); Teemu Eloranta, Luumäki (FI); Mika Illi, Vantaa (FI); Kari Vänttinen, Espoo (FI)

(73) Assignee: Metso Finland Oy, Espoo (FI)

( * ) Notice: Subject to any disclaimer, the term of this patent is extended or adjusted under 35 U.S.C. 154(b) by 512 days.

(21) Appl. No.: 17/793,552

(22) PCT Filed: Apr. 17, 2020

(86) PCT No.: PCT/FI2020/050255
§ 371 (c)(1),
(2) Date: Jul. 18, 2022

(87) PCT Pub. No.: WO2021/209680
PCT Pub. Date: Oct. 21, 2021

(65) Prior Publication Data
US 2023/0058248 A1     Feb. 23, 2023

(51) Int. Cl.
B01D 25/164     (2006.01)
B01D 25/21     (2006.01)
F16J 15/12     (2006.01)

(52) U.S. Cl.
CPC ....... B01D 25/1645 (2013.01); B01D 25/215 (2013.01); F16J 15/122 (2013.01); B01D 2201/342 (2013.01)

(58) Field of Classification Search
CPC ......................... B01D 25/1645; B01D 25/164; B01D 25/215; B01D 2201/34; B01D 2201/342; F16J 15/122
See application file for complete search history.

(56) References Cited

U.S. PATENT DOCUMENTS

| | | | |
|---|---|---|---|
| 2,886,284 A | * | 5/1959 | Wheatley .............. F16K 3/0227 |
| | | | 251/358 |
| 4,597,583 A | | 7/1986 | Inciong et al. |

(Continued)

FOREIGN PATENT DOCUMENTS

| | | |
|---|---|---|
| CN | 1179731 A | 4/1998 |
| CN | 101793220 A | 8/2010 |

(Continued)

OTHER PUBLICATIONS

Preliminary Office Action for Brazilian Patent application No. BR112022014979-4, received Oct. 18, 2024.

(Continued)

*Primary Examiner* — Benjamin M Kurtz
(74) *Attorney, Agent, or Firm* — Andrus Intellectual Property Law, LLP

(57) ABSTRACT

A sealing strip for sealing adjacent filter plate assemblies of a horizontal filter press. The disclosure is based on the idea of providing the sealing strip with a stiffener at a base portion of the sealing strip, positioned such that it intersects with a line running through a ridge provided on a distal portion of the sealing strip and extending along a vertical direction, perpendicular to both the length direction and the width direction of the sealing strip, as seen along the cross-sectional profile of the sealing strip. A filter frame, a filter frame assembly and a filter apparatus having such a sealing strip are also provided.

24 Claims, 3 Drawing Sheets

(56)                    References Cited

U.S. PATENT DOCUMENTS

| 2012/0049409 | A1 | 3/2012 | Guzowski |
| 2014/0138919 | A1 | 5/2014 | Barrall |

FOREIGN PATENT DOCUMENTS

| CN | 203090555 | U | 7/2013 |
| CN | 203620325 | U | 6/2014 |
| CN | 107345571 | A | 11/2017 |
| CN | 109224544 | A | 1/2019 |
| CN | 208436455 | U | 1/2019 |
| CN | 208436457 | U | 1/2019 |
| CN | 109364543 | A | 2/2019 |
| CN | 208770916 | U | 4/2019 |
| CN | 209348196 | U | 9/2019 |
| CN | 209596640 | U | 11/2019 |
| WO | 2017068241 | A1 | 4/2017 |
| WO | 2017068242 | A1 | 4/2017 |
| WO | 2018150075 | A1 | 8/2018 |

OTHER PUBLICATIONS

Extended European Search Report for EP Application No. 20931222.
2, dated Nov. 16, 2023.
First Office Action for Chinese Patent Application No. 2021104178906,
mailed Oct. 26, 2022.
International Search Report and Written Opinion for PCT/FI2020/
050255, mailed Sep. 9, 2020.

\* cited by examiner

SEALING STRIP FOR SEALING ADJACENT FILTER PLATE ASSEMBLIES OF A FILTER PRESS, SUCH AS A TOWER PRESS, A FILTER FRAME, A FILTER FRAME ASSEMBLY AND A FILTER APPARATUS

CROSS-REFERENCE TO RELATED APPLICATIONS

This application is the U.S. national stage application of International Application PCT/FI2020/050255, filed Apr. 17, 2020, which international application was published on Oct. 21, 2021, as International Publication WO 2021/209680 A1 in the English language.

FIELD OF THE DISCLOSURE

The present disclosure relates to filter presses, such as horizontal filter presses, e.g. tower presses, and more particularly to sealing strips used in such filter presses for sealing the interface between adjacent filter frame assemblies, between which a filter chamber is formed.

The present disclosure further concerns a filter frame, a filter frame assembly and a horizontal filter press apparatus, such as a tower press.

BACKGROUND OF THE DISCLOSURE

A sealing strip has conventionally been used for sealing the interface between two adjacent filter frame assemblies, in between which a filter chamber is formed. Such a filter frame assembly may be formed by a frame-and-plate assembly, or a recessed plate incorporating the frame and plate portions. The sealing strip must be able seal the filtration pressure prevailing in the filter chamber against the environmental pressure, in addition to withstand the compression pressure at which the adjacent filter frame assemblies are pressed against each other. Due to the repetitive compression cycles and the often abrasive nature of the slurry being filtered, the sealing strip is a wear part which must be replace periodically.

The sealing strip is commonly attached to the filter frame by providing the frame with as groove having a cross-sectional profile that tightly matches that of the sealing strip, so as to secure the two to each other, while the elasticity of the sealing strip allows it to be inserted into the groove during installation. As the sealing strip must surround a relatively large filter chamber, the sealing strip is typically provided as an elongate strip having a first longitudinal end and as second longitudinal end (as opposed a strip formed as a closed loop) for manufacturing and installation reasons.

Consequently, the longitudinal ends must adjoin each other firmly, so that a tight seal is formed between the longitudinal ends of the sealing strip. As the sealing strip is made from an elastic material for practical reasons, achieving a sufficient abutting compression between the longitudinal ends of the sealing strip is typically rather cumbersome and time consuming. This is firstly because the sealing strip elastically deforms when the longitudinal ends are presses against each other, and secondly because the remaining sealing strip that is already inserted in the groove of the frame prevents the axial ends from being pushed against each other, and tends to pull the longitudinal ends back.

Attempts to overcome this have been made by using an adhesive to secure the position of the sealing strip in the groove, thus fixing the axial ends of the strip pressed against each other. However, this hinders the removal and replacement of the sealing strip, as the groove must be cleaned from remains of the adhesive before a new sealing strip can be installed. Additionally, the adhesive must be allowed to set before the filter frame assembly can be used.

Moreover, a sealing strip requires a sufficient height extending out from the groove on the filter frame to allow sufficient compression to achieve a required sealing effect. However, it is not desirable to have an excessive height of the sealing strip extending out of the groove, as this increases the distance which adjacent filter frame assemblies must travel to open and close the filter chamber and to achieve a sufficient sealing pressure at the sealing strip, thereby increasing the cycle time of each filtration cycle.

At the same time, the sealing strip requires require a sufficient height extending within the groove so that the sealing strip is securely attached to the filter frame. However, increasing the height of the sealing strip even within the groove also increases the distance which adjacent filter frame assemblies must travel to open and close the filter chamber and to achieve a sufficient sealing pressure at the sealing strip, thereby increasing the cycle time of each filtration cycle.

BRIEF DESCRIPTION OF THE DISCLOSURE

An object of the present disclosure is to provide a sealing strip for sealing adjacent filter plate assemblies of a horizontal filter press, such as a tower press, which sealing strip provides for shortened cycle times and improved sealing between the longitudinal ends of the sealing strip and the interface between the sealing strip and an associated groove, while simultaneously facilitating installation and replacement.

It is a further object of the present disclosure to provide a filter frame, a filter frame assembly and a filter apparatus.

The objects of the disclosure are achieved by the sealing strip, filter frame, filter frame assembly and the filter apparatus, which are characterized by what is stated in the independent claims. The preferred embodiments of the disclosure are disclosed in the dependent claims.

The disclosure is based on the idea of providing the sealing strip with a stiffener at a base portion of the sealing strip, positioned such that it intersects with a line running through a ridge provided on a distal portion of the sealing strip and extending along a vertical direction, perpendicular to both the length direction and the width direction of the sealing strip, as seen along the cross-sectional profile of the sealing strip.

This ensures that deformation caused by compression exerted on the sealing strip by an adjacent surface against which it is presses is resisted by the stiffener. In this way a greater surface pressure between the sealing strip and the surface against which it is pressed is achieved with a smaller deformation.

As a result, several advantages are achieved simultaneously. Firstly, a sufficient sealing pressure between longitudinal ends of the sealing strip is more readily achieved, as the longitudinal ends can be pushed against each other more easily, and less deformation is needed. Secondly, the less deformation is required from the base of the sealing strip to achieve a sufficient sealing pressure between the sealing strip and the sealing groove. Consequently, the sealing between the sealing strip and the sealing groove is improved while installation of the sealing strip into sealing groove is facilitated. Thirdly, also less deformation of the sealing strip is required to achieve a sufficient sealing between the sealing strip and the adjacent filter frame assembly. Consequently, the sealing between the sealing strip and the adjacent filter frame assembly is achieved, while a shorter compression travel for achieving a sufficient surface pressure, closing the filter chamber is required thereby reducing the total travel required for opening and closing a filter chamber. As a result, the cycle time of each filtration cycle is reduced.

BRIEF DESCRIPTION OF THE DRAWINGS

In the following the disclosure will be described in greater detail by means of preferred embodiments with reference to the accompanying drawings, in which FIG. 1 schematically shows a part of a filter frame assembly according to an embodiment of the present disclosure, illustrated as cross-sectional cut view, as seen along a longitudinal direction.

DETAILED DESCRIPTION OF THE DISCLOSURE

Figure 1:
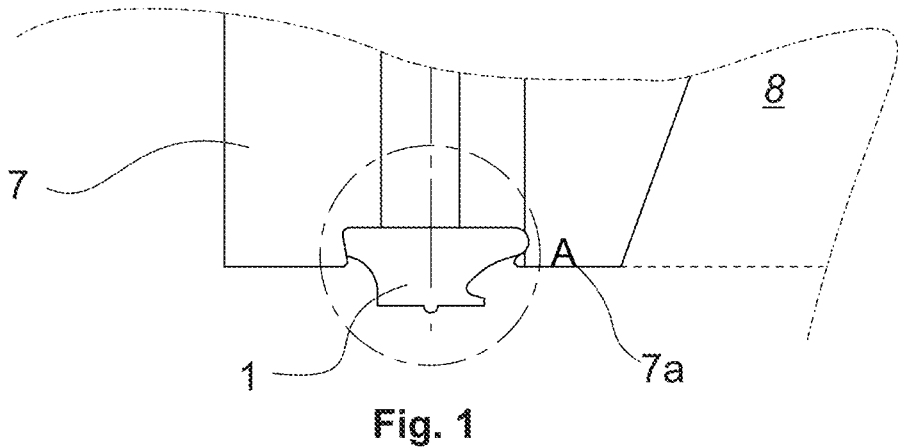
FIG. 1a is a detailed view of FIG. 1 showing the sealing strip and a sealing groove in which it is received.

According to a first aspect of the present disclosure, a sealing strip 1 for sealing adjacent filter plate assemblies of a filter press, such as a horizontal filter press, e.g. a tower press, is provided.

Typically, such horizontal filter presses are used for filtering slurries which are fed into the filter chamber with a filtration pressure differential of 8-20 bar with respect to the environmental pressure, typically with a pressure differential of approximately 12 bars. In order to achieve a sufficient sealing at the interface between adjacent filter frame assemblies, a sealing strip must withstand a linear load of 30-300 N/mm, typically a linear of between 100-150 N/mm.

The sealing strip 1 comprises an elongate body 2 extending along a length direction and having a first longitudinal lend 1a and second longitudinal end 1b.

The elongated body 2 has a cross-sectional profile comprising a base portion 3 to be attached in a corresponding groove 9 of an associated filter frame or filter plate assembly. The cross-sectional profile of the sealing strip 2 also comprises a distal portion 4 for sealing against an adjacent filter plate assembly. A ridge 4a is provided on the distal portion 4 for increasing a sealing pressure thereat, when the sealing strip 1 is compressed against an adjacent filter plate assembly. The cross-sectional profile of the sealing strip 1 also comprises an intermediate portion 5 between the base portion 3 and the distal portion 4.

The intermediate portion 5 has a width W5, defined along a lateral direction transverse and coplanar to the length direction, less than that W3 of the base portion 3. In other words, the cross-sectional profile of the sealing strip 1, as seen along the longitudinal direction, is more narrow at the intermediate portion 5 than at the base portion 3.

The sealing strip 1 further comprises an elongate stiffener 6 running along at least a part of the length of the sealing strip 1.

Moreover, the stiffener intersects a line (L1) running through the ridge 4a and extending along a vertical direction, perpendicular to both the length direction and the width direction, as seen along the cross-sectional profile.

Moreover, the stiffener 6 is encapsulated by the body 2 of the sealing strip 1.

In an embodiment according to the first aspect of the present disclosure, the stiffener 6 is longitudinally spaced apart from either or both of the first longitudinal end 1a and the second longitudinal end 1b.

Preferably, but not necessarily, the stiffener 6 is longitudinally spaced apart for a distance D of 1 mm-10 mm from either or both of the first longitudinal end 1a and the second longitudinal end 1b.

In an embodiment according to the first aspect of the present disclosure, the stiffener 6 is of a material having a greater rigidity than that of the body 2 of sealing strip 1.

For example, the stiffener 6 may have an elastic modulus of at least 100 times greater than that of the body 2. Preferably, but not necessarily, the stiffener 6 may have an elastic modulus of at least 500 times greater than that of the body 2. More preferably, but not necessarily, the stiffener 6 may have an elastic modulus of at least 1 000 times greater than that of the body (2). Most preferably, but not necessarily, the stiffener 6 may have an elastic modulus of at least 10 000 times greater than that of the body 2. It should be noted, that the stiffener 6 may even have an elastic modulus of at least 100 000 times greater than that of the body 2. It should be additionally noted, that in addition to the elastic modulus, for example the geometry such as the cross-sectional shape of the stiffener 6 affect the rigidity provided by the stiffener 6.

In an embodiment according to the first aspect of the present disclosure, the stiffener 6 has a cross-sectional maximum width along the lateral direction of between 10%-85% of the cross-sectional maximum total width of the sealing strip (1) along the lateral direction.

Preferably, but not necessarily, the stiffener 6 may have a cross-sectional maximum width along the lateral direction of between 30%-75% of the cross-sectional maximum total width of the sealing strip 1 along the lateral direction.

More preferably, but not necessarily, the stiffener 6 may have a cross-sectional maximum width along the lateral direction of between 50%-60% of the cross-sectional maximum total width of the sealing strip 1 along the lateral direction.

Suitably, the cross-sectional maximum total width is exhibited at the base portion 3 of the sealing strip 1.

In an embodiment according to the first aspect of the present disclosure, the stiffener 6 has a cross-sectional maximum height along the vertical direction of between 10%-50% of the cross-sectional maximum total height of the sealing strip 6 along the vertical direction, Preferably, but not necessarily, the stiffener 6 may have a cross-sectional maximum height along the vertical direction of between 12%-35% of the cross-sectional maximum total height of the sealing strip 1 along the vertical direction.

More preferably, but not necessarily, the stiffener 6 may have a cross-sectional maximum height along the vertical direction of between 15%-25% of the cross-sectional maximum total height of the sealing strip 1 along the vertical direction.

Suitably, the cross-sectional maximum total height is exhibited at the line L1 running through the ridge 4a and extending along a vertical direction, perpendicular to both the length direction and the width direction, as seen along the cross-sectional profile.

In an embodiment according to the first aspect of the present disclosure, the sealing strip 1 is asymmetric with respect to a centre line L1 running vertically through a lateral centre of the distal portion 4, thus defining a chamber side 1*c* and an outer side 1*d*.

Preferably, but not necessarily, the centre line L1 runs through the ridge 4*a*.

Preferably, but not necessarily, the base portion 3 extends laterally further on the chamber side 1*c* than on the outer side 1*d*, with respect the centre line L1.

Preferably, but not necessarily, the intermediate portion 5 extends laterally further on the outer side 1*d* than on the chamber side 1*c*, with respect the centre line L1

Preferably, but not necessarily, the base portion 3 exhibits a larger curvature on the chamber side 1*c* than on the outer side 1*d*.

Preferably but not necessarily, the cross-sectional profile of the sealing strip 1, on the chamber side 1*c*, the curvature of the base portion 3 extends up to the intermediate portion continuously.

For example, the curvature of the base portion 3 may transform into the intermediate portion as a continuous curvature.

Preferably, but not necessarily, on the outer side 1*d*, the cross-sectional shape of the base portion 3 exhibits a linear contour extending up to the intermediate portion 5.

It should be noted that the first aspect of the present disclosure encompasses any combination of two or more embodiments, or variants thereof, as discussed above.

According to a second aspect of the present disclosure, a filter frame 7 for a filter press, such as a horizontal filter press, e.g. tower press, is provided. The filter frame 7 defines defining a boundary forming a laterally closed planar opening 8. It should be noted, that the frame 7 itself does not need to be planar. However, the opening 8 should be planar in the sense that it has at least one planar boundary (i.e. the opening 8 itself may occupy a three-dimensional space). When in use, the planar opening 8 forms a lateral wall of a filter chamber. The frame of the filter press may be provided as a separate frame (which, in turn, could be provided as an assembly of separate frame portion), or alternatively as an integrated frame portion of a recessed-type plate incorporating the filter plate and plate frame as an joint entity.

The filter frame 7 comprises, on a planar side 7*a* thereof, a sealing groove 9 surrounding the planar opening 8. The sealing groove 9 has a cross-sectional profile comprising a bottom portion 10, and a neck portion 11 opening between the bottom portion 10 and the planar side 7*a* of the filter frame 7. The neck portion 11 has cross-sectional width W11 less than that W10 of the bottom portion 10. In the context of this disclosure, the width direction of the sealing groove's 9 cross-sectional profile is defined as coplanar with the longitudinal direction of the filter groove (i.e. the direction in which it the groove extends around the filter frame), and transverse to it. In other words, in the cross-sectional profile of the frame 7, as seen along a direction in which the groove extends at a given point, the neck portion 11 is more narrow than the bottom portion 10.

Particularly, the cross-sectional profile of the sealing groove 9 may be asymmetric with respect to a vertical line L7 extending perpendicularly to the planar side 7*a* through a lateral centre point of the bottom portion 10, thus defining a chamber side 1*c* and a an outer side 1*d*.

Preferably, but not necessarily, the chamber side 1*c* of the bottom portion 10 may exhibit a larger curvature than the outer side 1*d* of the bottom portion 10.

Preferably, but not necessarily, in the cross-sectional profile of the filter frame 7, on the chamber side 7*c*, the curvature of the bottom portion 10 extends up to the neck portion 11 continuously.

For example, the curvature of the bottom portion 10 may transform into the neck portion 11 as a continuous curvature.

Preferably, but not necessarily, in the cross-sectional profile of the filter frame 7, on the outer side 7*d*, the bottom portion 10 exhibits a linear contour extending up to the neck portion 11.

It should be noted that the second aspect of the present disclosure encompasses any combination of two or more embodiments, or variants thereof, as discussed above.

According to a third aspect of the present disclosure, a filter frame assembly for supporting a filter plate of a filter press, such as a horizontal filter press, e.g. a tower press, is provided.

The frame assembly comprises a filter frame 7 defining a boundary forming a laterally closed planar opening 8. As discussed above, the filter frame 7 itself does not need to be planar, although the opening 8 should be planar in the sense, that it defines at least one planar boundary thereof. That is, the opening 8 may occupy a three-dimensional space defining at least one plane thereon. When in use, the planar opening 8 forms a lateral wall of a filter chamber. The filter frame 7 be provided as a separate frame (which, in turn, could be provided as an assembly of separate frame portions), or alternatively, as an integrated frame portion of a recessed-type plate incorporating the filter plate and plate frame as an joint entity.

The filter frame 7 comprises, on a planar side 7*a* thereof, a sealing groove surrounding the planar opening 8. The sealing groove 9 has a cross-sectional profile comprising a bottom portion 10, and a neck portion 11 opening between the bottom portion 10 and the planar side 7*a* of the filter frame 7. Moreover, the neck portion 11 has cross-sectional width W11 less than that W10 of the bottom portion 10. That is, in the cross-sectional profile of the frame 7, the neck portion 11 is more narrow than the bottom portion 10, as seen a the direction in which the groove extends at a given point.

Particularly, the filter plate assembly further comprises the sealing strip 1 according to any the first aspect of the present disclosure. The sealing strip 1 is received in the sealing groove 9, such that the bottom portion 10 of the filter plate 7 form-fittingly engages the base portion 3 of the sealing strip 1, thereby securing the sealing strip 1 to the filter frame 7.

In an embodiment according to the third aspect of the present disclosure, both the sealing strip 1 and the sealing groove 9 of the filter frame 7 are asymmetric, as discussed in connection with the respective embodiments, and variants thereof, of the first and second aspects of the present disclosure.

In an embodiment according to the third aspect of the present disclosure, both the sealing strip 1 and the sealing groove 9 exhibit a larger curvature on the chamber side 1*c*; 7*c* than on the outer side 1*d*; 7*d*, as discussed in connection with the respective embodiments, and variants thereof, of the first and second aspects of the present disclosure.

In an embodiment according to the third aspect of the present disclosure, in the cross-sectional profile of both the sealing strip 1 and the sealing groove 9 of the filter frame 7, on the chamber side 1*c*; 7*c*, the curvature of the base portion and the bottom portion 10 extend up to the intermediate portion 5 and, respectively, the neck portion 11, in a continuous manner, as discussed in connection with the corresponding embodiments, and variants thereof, of the first and second aspects of the present disclosure In an embodiment according to the third aspect of the present disclosure, in the cross-sectional profile of both the sealing strip 1 and the sealing groove 9 of the filter frame 7, on the outer side 1*d*; 7*d*, the base portion and the bottom portion 10 exhibit a linear contour extending up to the intermediate portion 5 and, respectively, the neck portion 11, as discussed in connection with the corresponding embodiments, and variants thereof, of the first and second aspects of the present disclosure According to a fourth aspect of the present disclosure, a filter press is provided. Preferably, but not necessarily, the filter press is a horizontal filter press, such as a tower press.

The filter press comprises a plurality of filter frame assemblies according to any of the embodiments, or variants thereof, of the third aspect according to the present disclosure, as discussed above. The filter frame assemblies are configured movable towards each other into a closed position in which a filter chamber is formed between adjacent filter frame assemblies, and away from each to an open position in which adjacent filter frame assemblies are spaced apart from each other.

The filter press further comprises a filter medium arranged between adjacent filter frame assemblies.

The filter press further comprises a translation arrangement for moving the filter frame assemblies towards each other so as to form a filter chamber between adjacent filter frame assemblies, and away from each other so as to open the filter chamber.

The filter press further comprises a feed arrangement for feeding slurry into the filter chamber.

The filter press further comprises a recovering arrangement for recovering filtrate from the filter chamber.

The filter press further comprises a discharge arrangement for discharging a filter cake formed within the filter chamber.

Figure 1A:
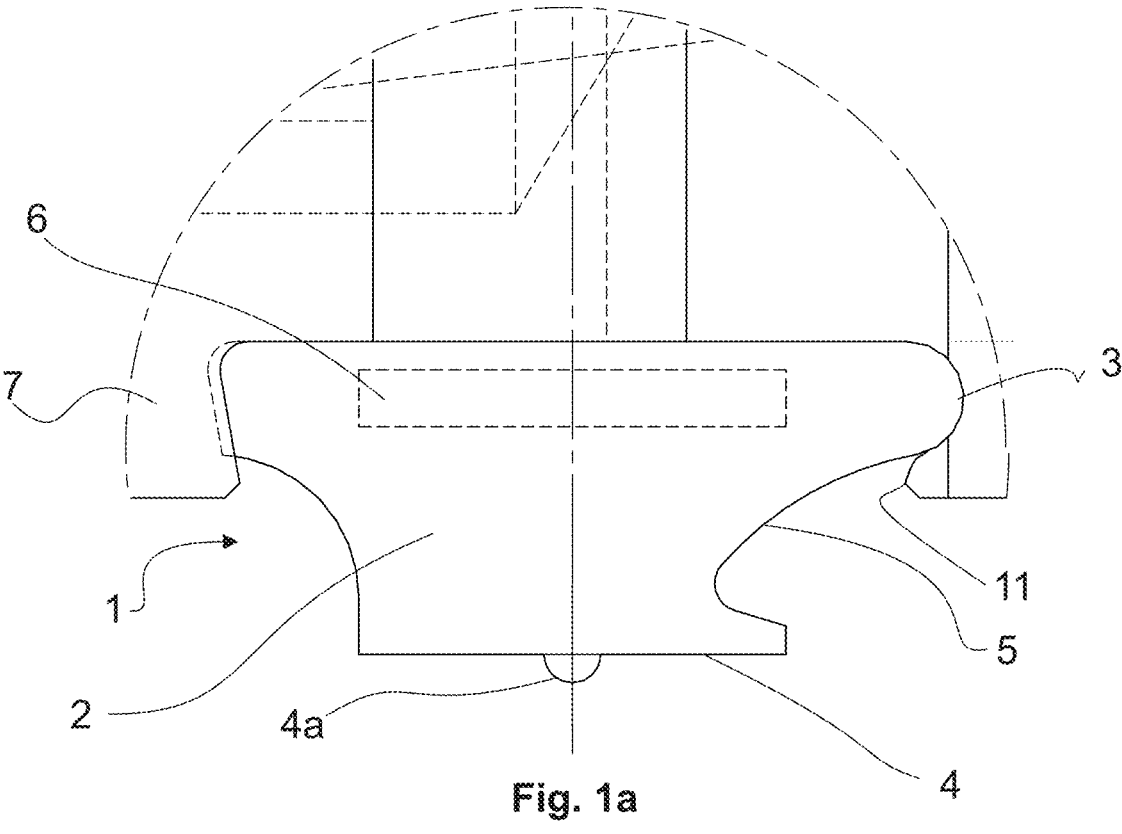

FIG. 1 schematically shows a part of a filter frame assembly according to an embodiment of the fourth aspect of the present disclosure, illustrated as a cross-sectional cut view, as seen along a longitudinal direction. The filter frame assembly comprises a filter frame 7 and a sealing strip 1 attached to it on a planar side 7*a* of the filter frame 7. The filter frame 7 defines a boundary forming a laterally closed planar opening 8. FIG. 1*a* is a detailed view of FIG. 1 showing the sealing strip 1 and a sealing groove 9 of the filter frame 7 in which the sealing strip 1 is received.

Figure 2:
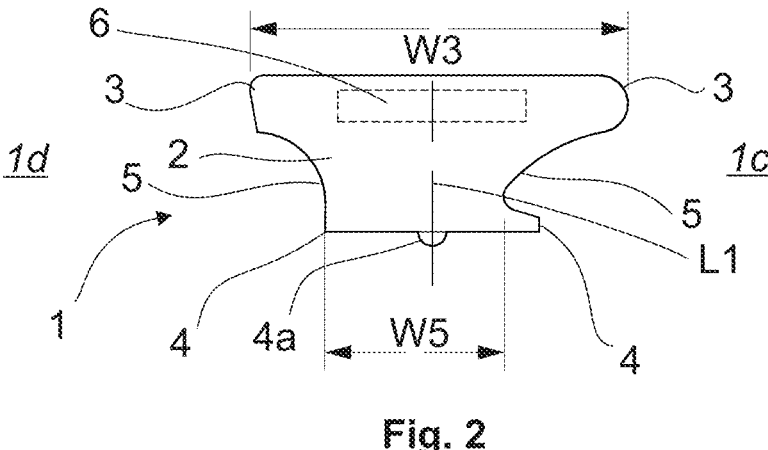
FIG. 2 schematically shows sealing strip according to an embodiment of the present disclosure, illustrated as cross-sectional cut view, as seen along a longitudinal direction of the sealing strip.
Figure 2A:
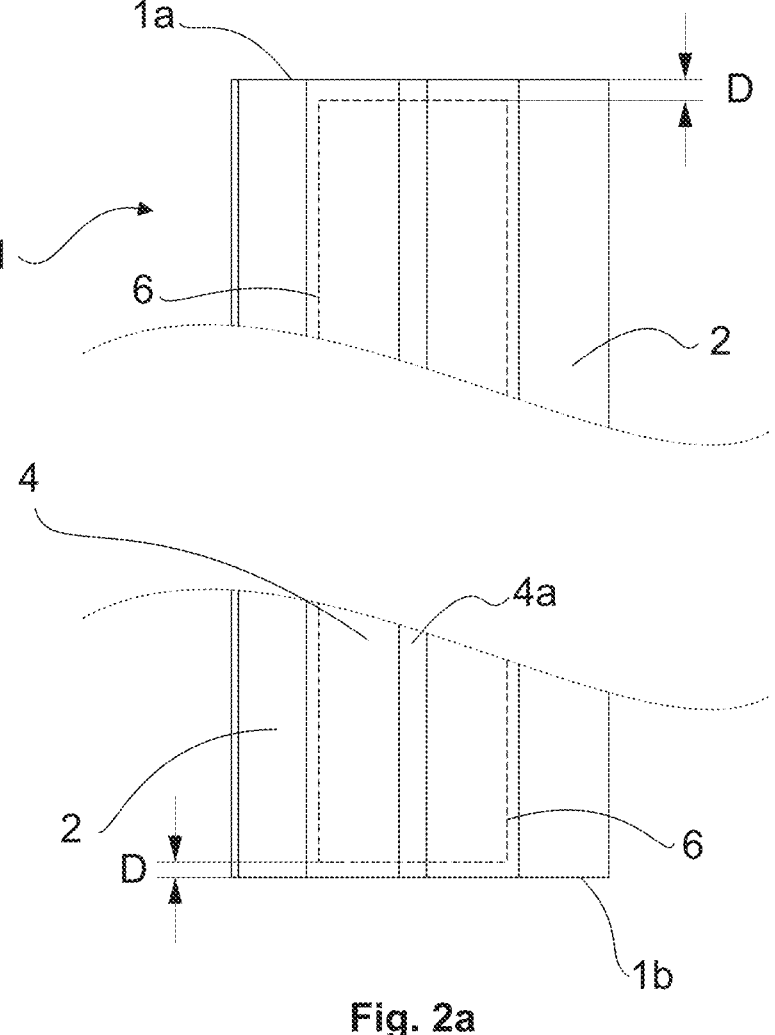
FIG. 2a is a plan view of the sealing strip of FIG. 2.

The sealing strip 1 of FIG. 1 is illustrated in more detail FIG. 2 and FIG. 2*a*. FIG. 2 schematically illustrates a cross-sectional profile of the sealing strip 1, whereas FIG. 2*a* illustrates a plan view of the sealing strip 1.

Figure 3:
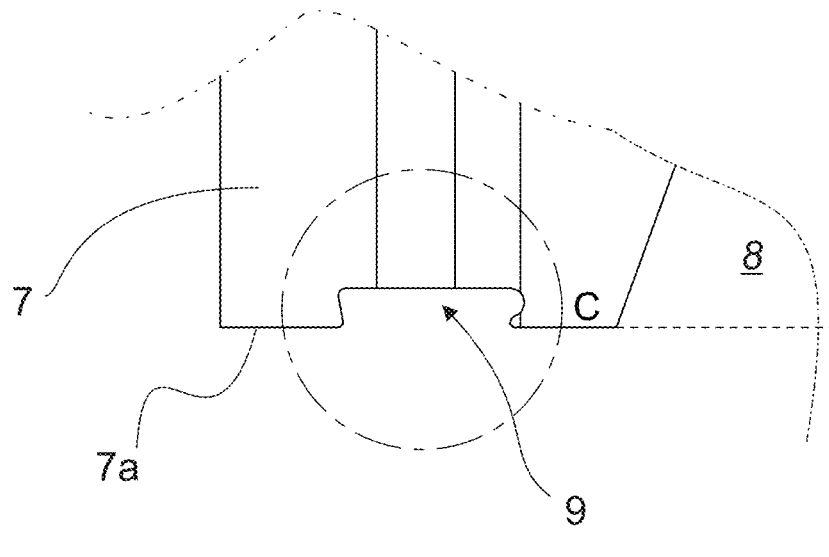
FIG. 3 schematically shows a filter frame according to an embodiment of the present disclosure, illustrated as cross-sectional cut view, as seen along a longitudinal direction.
Figure 3A:
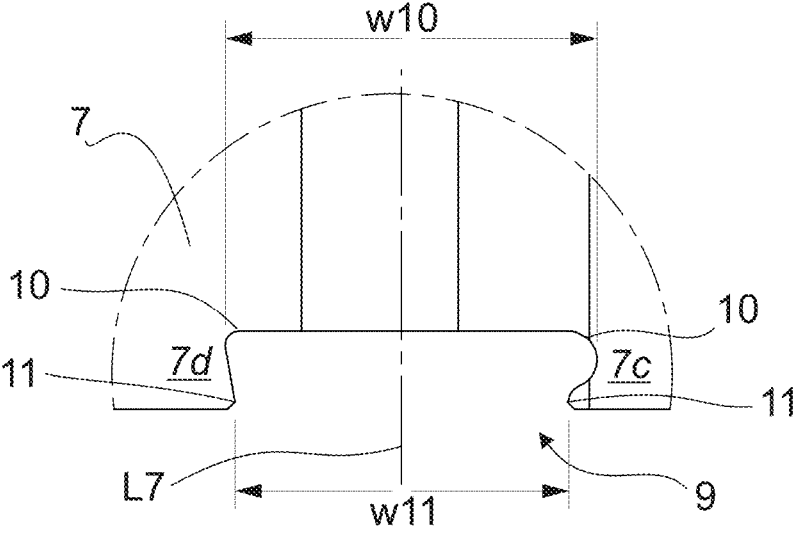
FIG. 3a is a detailed view of FIG. 3 showing the sealing groove of the filter frame.

The filter frame 7 of FIG. 1 is illustrated in more detail in FIG. 3 and FIG. 3*a*. FIG. 3 illustrates a cross-sectional profile of a section of the filter frame 7, whereas FIG. 3*a* illustrates a detailed view of the filter groove 9 of the filter frame 7.

LIST OF REFERENCE NUMERALS

1 sealing strip
1*a* first longitudinal end of sealing strip
1*b* second longitudinal lend of sealing strip
1*c* chamber side
1*d* outer side L1 vertical line extending through the lateral centre of the distal portion
2 elongate body
3 base portion
W3 width of base portion
4 distal portion of sealing strip
4*a* ridge on distal portion
5 intermediate portion of sealing strip
W5 width of intermediate portion
6 elongate stiffener
7 filter frame
7*a* planar side of filter frame
L7 vertical line extending through lateral centre of bottom portion 10
8 planar opening
9 sealing groove
10 bottom portion
W10 width of bottom portion
11 neck portion
W11 width of neck portion
D distance at which the stiffener is spaced apart form a longitudinal end

The invention claimed is:

1. A sealing strip for sealing adjacent filter plate assemblies of a horizontal filter press, the sealing strip comprising:

an elongate body extending along a length direction, and having first longitudinal end, a second longitudinal end and a cross-sectional profile;

a base portion configured to be attached in a corresponding groove of an associated filter frame or filter plate assembly;

a distal portion for sealing against an adjacent filter plate assembly, a ridge being provided on the distal portion for increasing a sealing pressure thereat, when the sealing strip is compressed against an adjacent filter plate assembly, and an intermediate portion between the base portion and the distal portion, wherein the intermediate portion has a width, defined along a lateral direction transverse and coplanar to the length direction, less than that of the base portion, wherein the sealing strip further comprises an elongate stiffener running along at least a part of the length of the sealing strip, wherein the stiffener is positioned at the base portion such that it intersects with a line running through the ridge and extending along a vertical direction, perpendicular to both the length direction and the width direction, as seen along the cross-sectional profile, and wherein the stiffener is encapsulated by the body of the sealing strip, wherein the stiffener is longitudinally spaced apart from both of the first longitudinal end and the second longitudinal end of the elongate body.

2. The sealing strip according to claim 1, wherein the stiffener is longitudinally spaced apart for a distance of 1 mm-10 mm from each of the first longitudinal end and the second longitudinal end.

3. The sealing strip according to claim 1, wherein the stiffener is of a material having a greater rigidity than that of the body of sealing strip.

4. The sealing strip according to claim 3, wherein the stiffener has an elastic modulus of at least 100 times greater than that of the body.

5. The sealing strip according to claim 1, wherein the stiffener has a cross-sectional maximum width along the lateral direction of between 10%-85% of the cross-sectional maximum total width of the sealing strip along the lateral direction.

6. The sealing strip according to claim 1, wherein the stiffener has a cross-sectional maximum height along the vertical direction of between 10%-50% of the cross-sectional maximum total height of the sealing strip along the vertical direction.

7. The sealing strip according to claim 1, wherein the sealing strip is asymmetric with respect to a centre line running vertically through a lateral centre of the distal portion, thus defining a chamber side and an outer side.

8. The sealing strip according to claim 7, wherein the base portion extends laterally further on the chamber side than on the outer side, with respect the centre line.

9. The sealing strip according to claim 7, wherein the intermediate portion extends laterally further on the outer side than on the chamber side, with respect the center line.

10. The sealing strip according to claim 7, wherein the base portion exhibits a larger curvature on the chamber side than on the outer side.

11. The sealing strip according to claim 10, wherein in the cross-sectional profile of the sealing strip, on the chamber side, the curvature of the base portion extends up to the intermediate portion continuously.

12. The sealing strip according to claim 7, wherein, on the outer side, the cross-sectional shape of the base portion exhibits a linear contour extending up to the intermediate portion.

13. A filter frame assembly for supporting a filter plate of a horizontal filter press, the frame assembly comprising a filter frame defining a boundary forming a laterally closed planar opening, wherein the filter frame comprises, on a planar side thereof, a sealing groove surrounding the planar opening, wherein the sealing groove has a cross-sectional profile comprising:

a bottom portion, and a neck portion opening between the bottom portion and the planar side of the filter frame, wherein the neck portion has cross-sectional width less than that of the bottom portion, wherein the filter frame assembly further comprises the sealing strip according to claim 1, wherein the sealing strip is received in the sealing groove, such that the bottom portion of the filter frame form-fittingly engages the base portion of the sealing strip, thereby securing the sealing strip to the filter frame.

14. The filter frame assembly according to claim 13, wherein the sealing strip is asymmetric with respect to a centre line running vertically through a lateral centre of the distal portion, thus defining a chamber side and an outer side.

15. The filter frame assembly according to claim 14 wherein the base portion exhibits a larger curvature on the chamber side than on the outer side and wherein in the cross-sectional profile of the sealing strip, on the chamber side, the curvature of the base portion extends up to the intermediate portion continuously.

16. The filter frame assembly according to claim 14 wherein, on the outer side, the cross-sectional shape of the base portion exhibits a linear contour extending up to the intermediate portion.

17. A horizontal filter press wherein the horizontal filter press comprises:

a plurality of filter frame assemblies according to claim 13, wherein the filter frame assemblies are configured movable towards each other into a closed position in which a filter chamber is formed between adjacent filter frame assemblies, and away from each other to an open position in which adjacent filter frame assemblies are spaced apart from each other;

a filter medium arranged between adjacent filter frame assemblies;

a translation arrangement for moving the filter frame assemblies towards each other so as to form a filter chamber between adjacent filter frame assemblies, and away from each other so as to open the filter chamber;

a feed arrangement for feeding slurry into the filter chamber;

a recovering arrangement for recovering filtrate from the filter chamber, and a discharge arrangement for discharging a filter cake formed within the filter chamber.

18. The sealing strip according to claim 3, wherein the stiffener has an elastic modulus of at least 500 times greater than that of the body.

19. The sealing strip according to claim 3, wherein the stiffener has an elastic modulus of at least 1,000 times greater than that of the body.

20. The sealing strip according to claim 3, wherein the stiffener has an elastic modulus of at least 10,000 times greater than that of the body.

21. The sealing strip according to claim 1, wherein the stiffener has a cross-sectional maximum width along the lateral direction of between 30%-75% of the cross-sectional maximum total width of the sealing strip along the lateral direction.

22. The sealing strip according to claim 1, wherein the stiffener has a cross-sectional maximum width along the lateral direction of between 50%-60% of the cross-sectional maximum total width of the sealing strip along the lateral direction.

23. The sealing strip according to claim 1, wherein the stiffener has a cross-sectional maximum height along the vertical direction of between 12%-35% of the cross-sectional maximum total height of the sealing strip along the vertical direction.

24. The sealing strip according to claim 1, wherein the stiffener has a cross-sectional maximum height along the vertical direction of between 15%-25% of the cross-sectional maximum total height of the sealing strip along the vertical direction.

\* \* \* \* \*